US012722254B2

(12) United States Patent
Chuang et al.

(10) Patent No.: US 12,722,254 B2
(45) Date of Patent: Sep. 1, 2026

(54) ONE-HANDED RATCHET CLAMP TOOL

(71) Applicant: EHOMA INDUSTRIAL CORPORATION, Taichung City (TW)

(72) Inventors: Chun-Huan Chuang, Taichung City (TW); Kai-Wei Hou, Taichung City (TW); Jyh-Yuh Chang, Taichung City (TW)

(73) Assignee: EHOMA INDUSTRIAL CORPORATION, Taichung City (TW)

( * ) Notice: Subject to any disclaimer, the term of this patent is extended or adjusted under 35 U.S.C. 154(b) by 299 days.

(21) Appl. No.: 18/621,141

(22) Filed: Mar. 29, 2024

(65) Prior Publication Data

US 2025/0276426 A1 Sep. 4, 2025

(30) Foreign Application Priority Data

Feb. 29, 2024 (TW) ................................ 113202007

(51) Int. Cl.
*B25B 5/02* (2006.01)
*B25B 5/06* (2006.01)
*B25B 5/08* (2006.01)

(52) U.S. Cl.
CPC ................ *B25B 5/068* (2013.01); *B25B 5/02* (2013.01); *B25B 5/085* (2013.01)

(58) Field of Classification Search
CPC ......... B25B 5/068; B25B 5/163; B25B 5/085; B25B 5/02; B25B 5/082; B25B 5/166; B25B 5/08; B25B 5/127

(Continued)

(56) References Cited

U.S. PATENT DOCUMENTS 7,530,556 B1 * 5/2009 Zheng ..................... B25B 5/085 269/166
9,328,751 B1 * 5/2016 Liu ........................... F16B 2/12

(Continued)

FOREIGN PATENT DOCUMENTS

CN 201030521 Y * 3/2008
CN 209566035 U 11/2019

OTHER PUBLICATIONS

Ehoma Groove clamp process G12KC, G12KL found at: https://www.youtube.com/watch?v=2EFW0J68S3E (Year: 2015).*

(Continued)

*Primary Examiner* — Mahdi H Nejad
(74) *Attorney, Agent, or Firm* — WPAT PC

(57) ABSTRACT

A one-handed ratchet clamp tool includes a slide rod, a fixed arm, a movable arm, an operation lever, a clam member, and a release member. The fixed arm is disposed on one end of the slide rod. The movable arm has one end slidably mounted around the slide rod, and another end having an imaginary face and a ratchet which include a dip angle larger than 30 degrees. The operation lever is pivotally disposed on the movable arm. The clamp member is movably disposed on the operation lever, which optionally presses the clamp member, clamping or releasing the clamp member and the fixed arm. The release member is connected with the operation lever and has a pawl, which is engaged with or disengaged from the ratchet to position the operation lever or allow the operation lever to sway away from the movable arm. Convenience of one-handed operation is facilitated.

10 Claims, 11 Drawing Sheets

(58) Field of Classification Search
USPC .............................................................. 269/6
See application file for complete search history.

(56) References Cited

U.S. PATENT DOCUMENTS

| | | | | |
|---|---|---|---|---|
| 2007/0035075 | A1* | 2/2007 | Lin | B25B 5/085 269/6 |
| 2008/0136077 | A1* | 6/2008 | Yang | B25B 5/068 269/6 |
| 2010/0084799 | A1* | 4/2010 | Wong | B25B 5/085 269/214 |
| 2015/0174737 | A1* | 6/2015 | Chen | B25B 5/085 269/216 |

OTHER PUBLICATIONS

Ehoma How to change the fixture of lever handle G L clamps, G12L, G16L, G20L, G30L found at: https://www.youtube.com/watch?v=49wNhkiQZS4 (Year: 2026).*
Good Hand Enterprise bar clamp GH-G16L (Year: 2026).*
How to use Festool Clamps and the different types Found at: https://www.youtube.com/watch?v=-nFWWTr7Xec (Year: 2023).*

* cited by examiner

ONE-HANDED RATCHET CLAMP TOOL

BACKGROUND OF THE INVENTION

1. Field of the Invention

The present invention relates to ratchet clamp tools, and more particularly, to a one-handed ratchet clamp tool.

2. Description of the Related Art

Referring to CN209566035U, a Ratchet F Clamp is disclosed, which comprises a slide rod, a fixed clamp, and a moving clamp. The fixed clamp is fixed to one end of the slide rod, and the moving clamp is slidably mounted around the slide rod. The moving clamp comprises a moving clamp head and a clamping lever. The clamping lever is configured to be optionally pressed against the moving clamp, so that the moving clamp is clamped with respect to the fixed clamp. Therein, the moving clamp and the clamping lever comprises a ratchet and a pawl, respectively. The pawl is engaged with the ratchet through the elastic force of an elastic element, so as to position the clamping lever, thereby maintaining a clamping status. When a release handle on the pawl is operated, the pawl is disengaged with the ratchet, so as to release the clamped object.

In FIG. 3 of the patent above, the ratchet F clamp is illustrated in a releasing status, wherein the clamping lever is not pressed against the moving clamp. Because the moving clamp has a certain length, and the distribution angle included by the ratchet on the moving clamp and a clamping face ranges between 20 to 70 degrees; in other words, the ratchet is disposed to include a 20-degree dip angle with the clamping face. Therefore, an operation angle of the clamping lever with respect to the slide rod is relatively large, so that the user is unable to operate the clamping lever by using only one hand. Further, when two positioning pins on the moving clamp are in the clamping status, the moving clamp remains being fixed on the slide rod. However, after a long period of usage, wearing might be caused to deteriorate the clamping force thereof.

SUMMARY OF THE INVENTION

To improve the issues above, the present invention discloses a one-handed ratchet clamp tool, which comprises a ratchet having a dip angle ranging from 30 to 60 degrees, so as to reduce the burden of hand in operation, such that the user is allowed to carry out the clamping operation by using only one hand to hold an operation lever.

For achieving the aforementioned objectives, an embodiment of the present invention provides a one-handed ratchet clamp tool, comprising a slide rod, a fixed arm, a movable arm, an operation lever, a clamp member, and a release member. The fixed arm is disposed on one end of the slide rod, and comprises a first clamping face. The movable arm comprises a first end and a second end. The first end is mounted around the slide rod to slide with respect thereto. The second end comprises an imaginary face and a ratchet disposed away from the first clamping face, wherein the ratchet and the imaginary face include a dip angle larger than 30 degrees. The operation lever is pivotally disposed on the second end of the movable arm. The clamp member is movably disposed on the operation lever, and comprises a second clamping face disposed facing the first clamping face. The operation lever is configured to optionally press the clamp member, whereby the first clamping face and the second clamping face clamp or release together. The release member is connected with the operation lever, and comprises a pawl. The release member is operated between an engagement position and a disengagement position. At the engagement position, the pawl is engaged with the ratchet to position the operation lever. At the disengagement position, the pawl is disengaged from the ratchet, allowing the operation lever to sway away from the movable arm.

With such configuration, the position of the operation lever on the movable arm is biased toward the slide rod, achieving a more ergonomic design, which makes natural movement of the hand smoother and easier. The user does not need to excessively force or adjust the hand posture when using only one hand, so that the convenience of one-handed operation is facilitated.

In another embodiment of the present invention, the first end of the movable arm comprises a slide hole to be mounted around the slide rod, with a wear-resistant abutting device disposed between the movable arm and the slide rod. Therefore, the relative position of the movable arm and the slide rod would not change due to wearing, so as to maintain the stable clamping effect. Also, the wear-resistant abutting device is removably disposed between the movable arm and the slide rod, facilitating the convenience of replacement and maintenance.

DETAILED DESCRIPTION OF THE INVENTION

Figure 1:
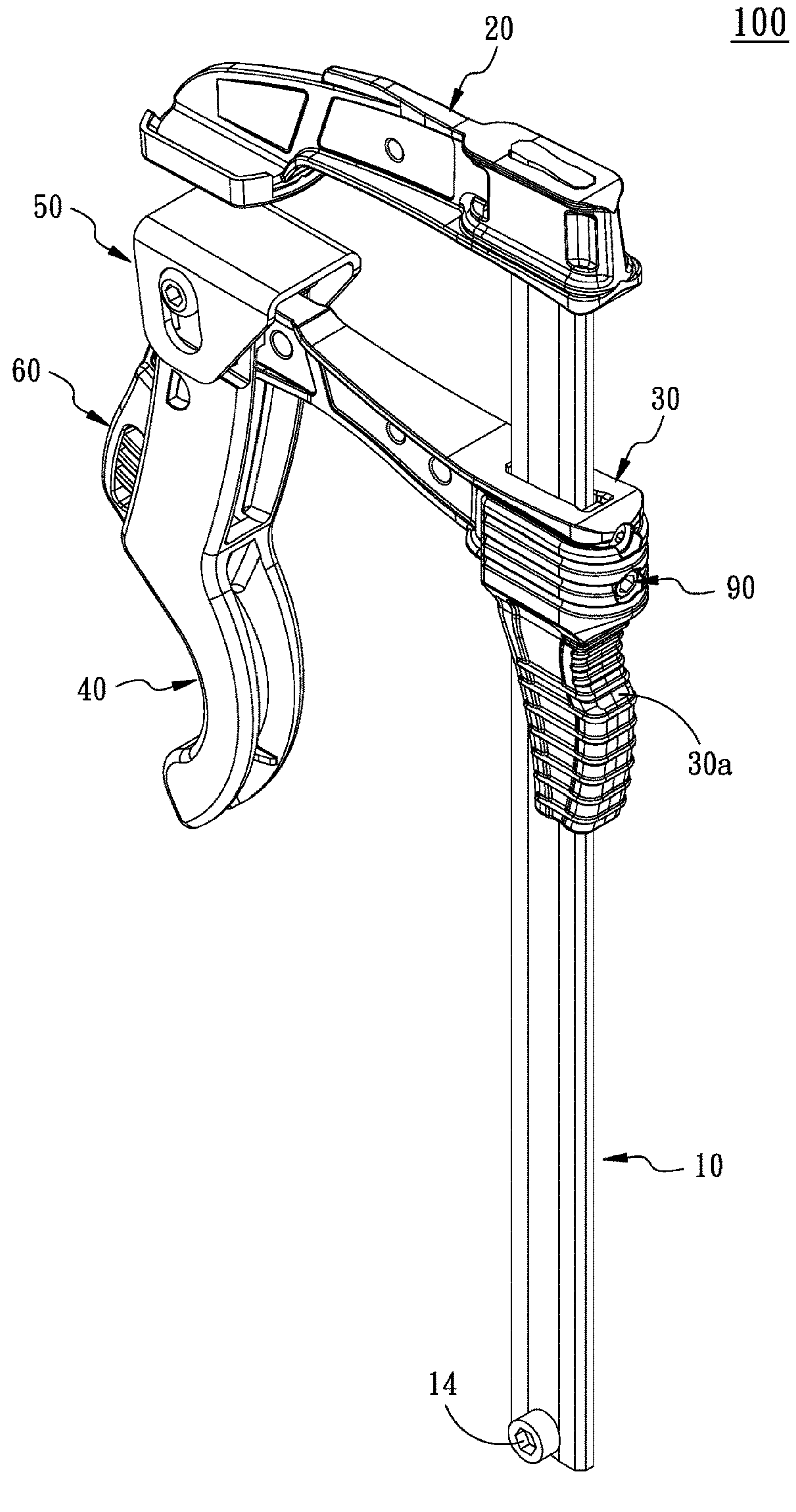
FIG. 1 is a perspective view of the one-handed ratchet clamp tool in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 10, the present invention provides a one-handed ratchet clamp tool 100, comprising a slide rod 10, a fixed arm 20, a movable arm 30, an operation lever 40, a clamp member 50, and a release member 60. The fixed arm 20 and the movable arm 30 are disposed on the same side of the slide rod 10, respectively, so as to form an F-shaped overall structure.

The slide rod 10 has a cross-sectional face shaped in a long rectangular shape. The slide rod 10 comprises two wide lateral sides 11 and a first narrow lateral side 12 and a second narrow lateral side 13 arranged between the two wide lateral sides 11.

The fixed arm 20 is disposed on one end of the slide rod 10, with a first clamping face 21 disposed on one end of the fixed arm 20. In the embodiment, the fixed arm 20 is fittingly mounted around the slide rod 10 through a sleeve hole 22.

Figure 6:
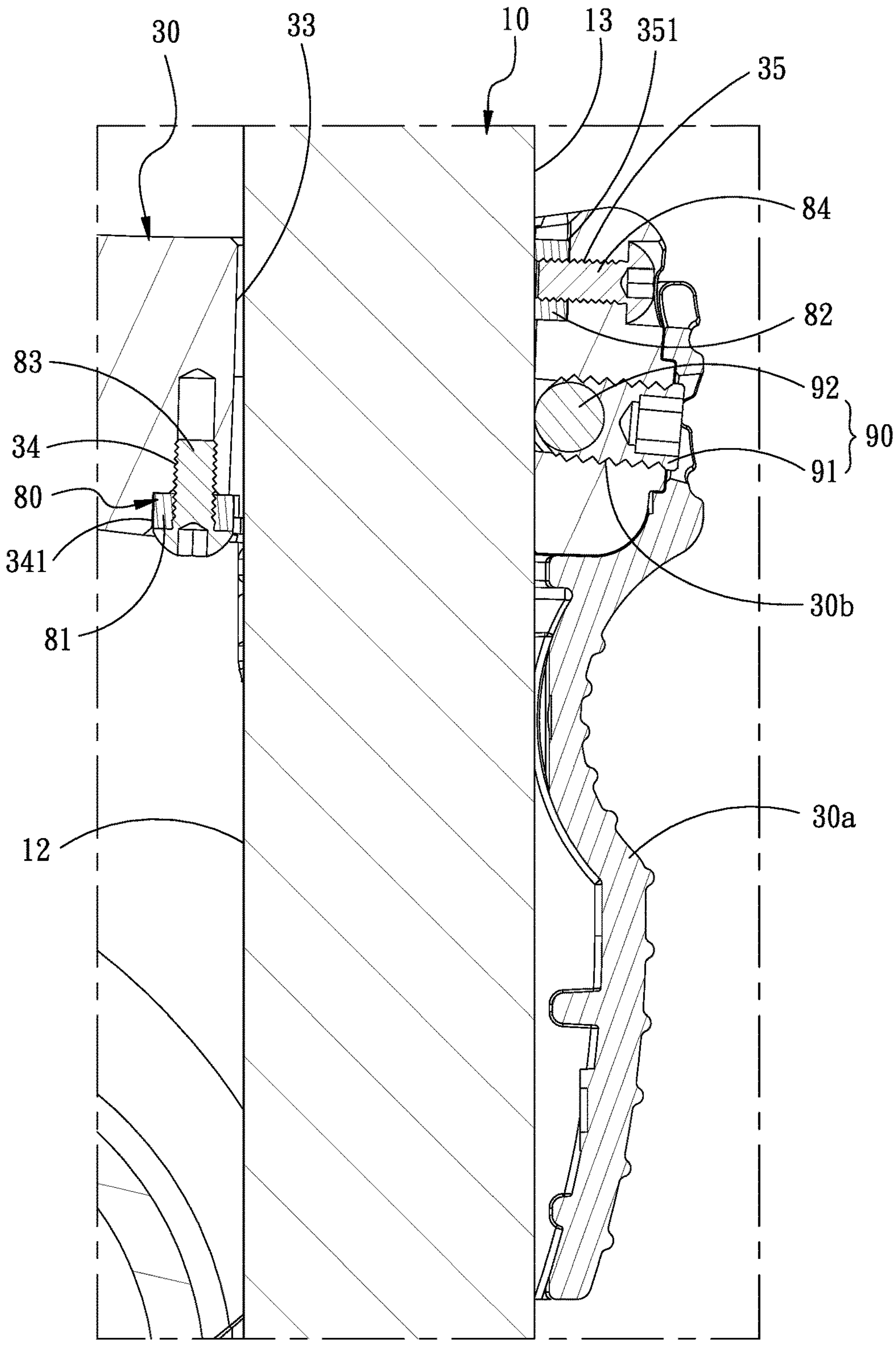
FIG. 6 is a partially enlarged view of FIG. 5.
Figure 7:
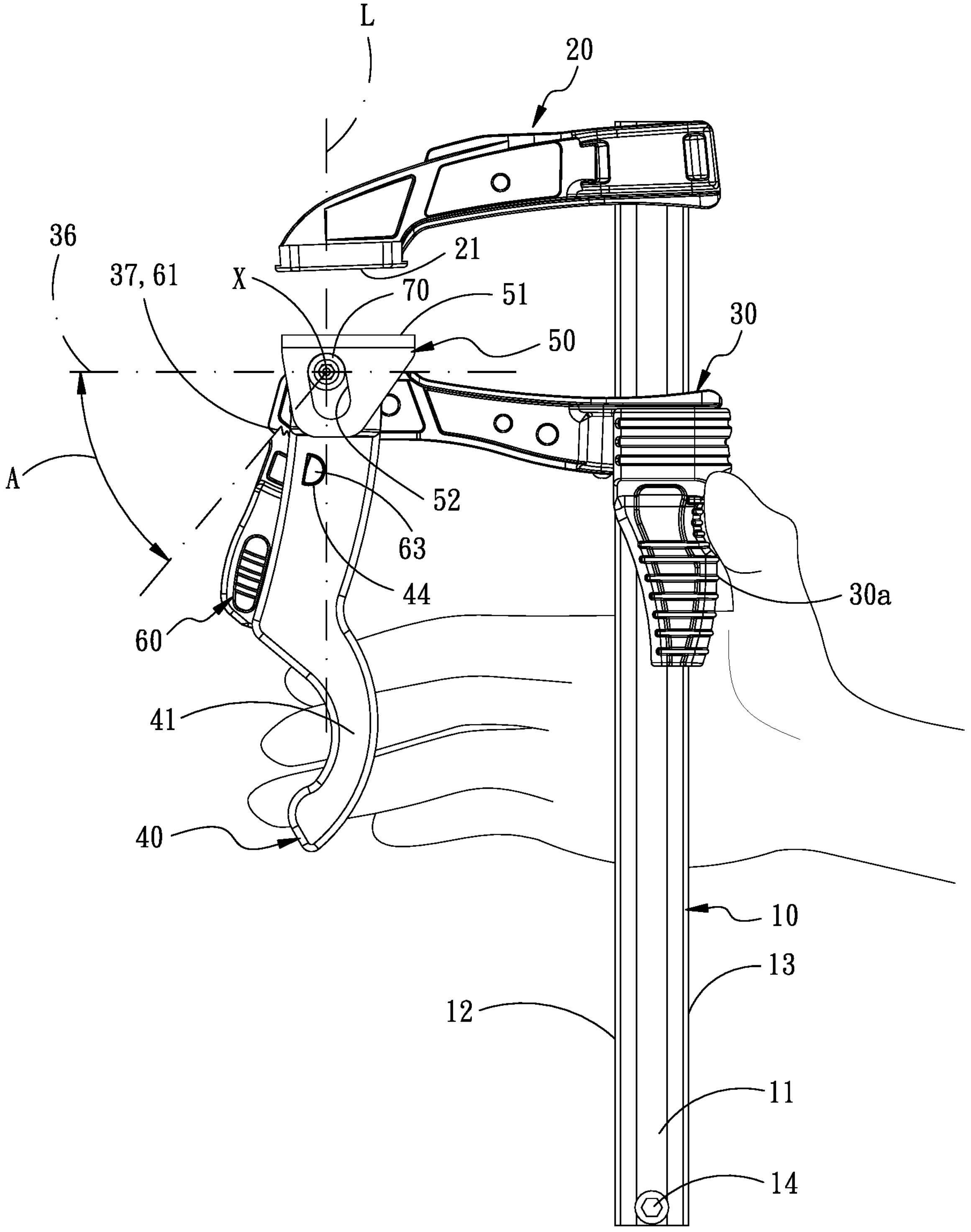
FIG. 7 is a schematic view of the operation status of the present invention, illustrating the operation lever and the slide rod being held by one hand.
Figure 8:
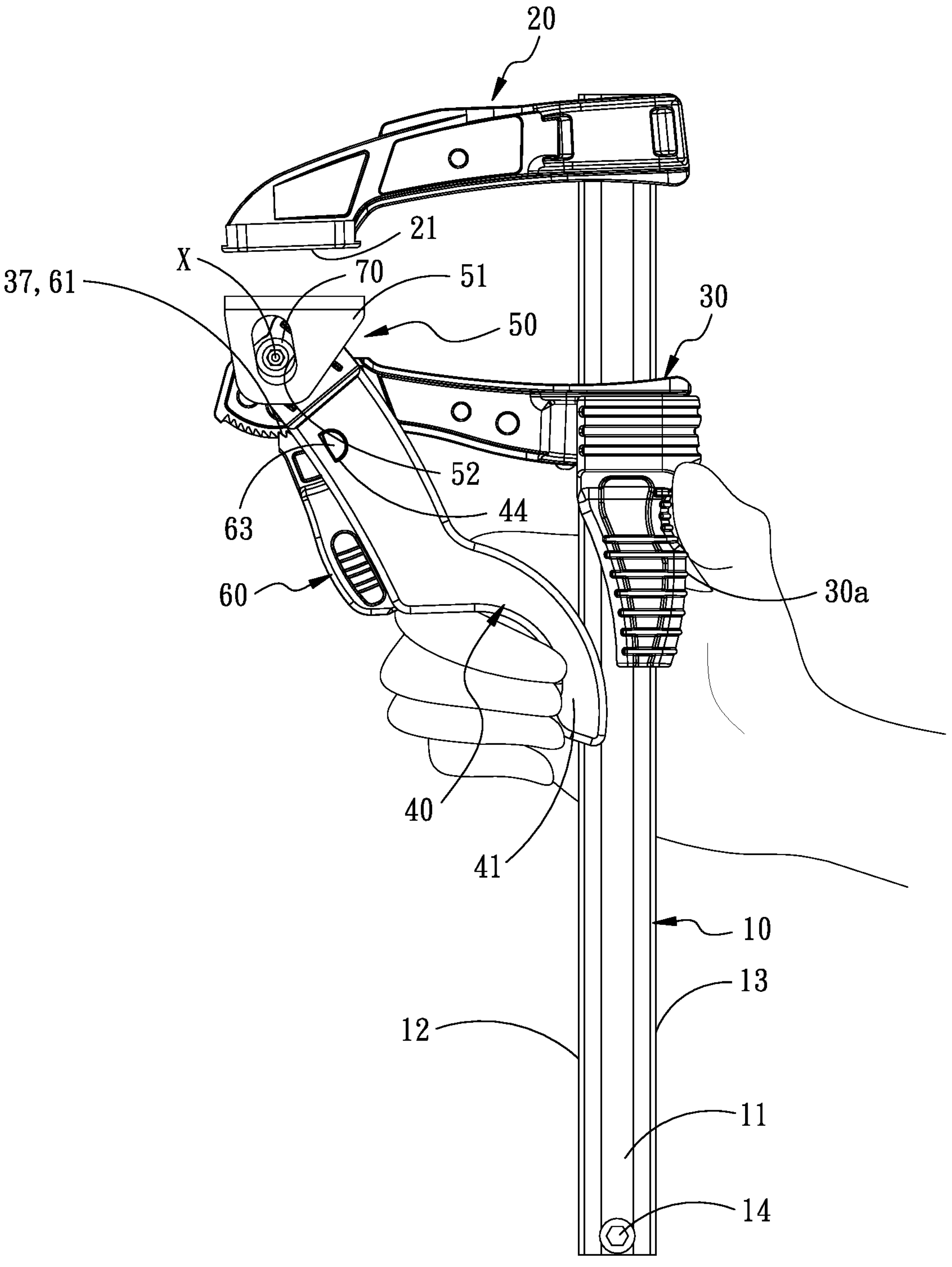
FIG. 8 is a schematic view of the present invention, illustrating the operation lever being pressed by one hand.
Figure 9:
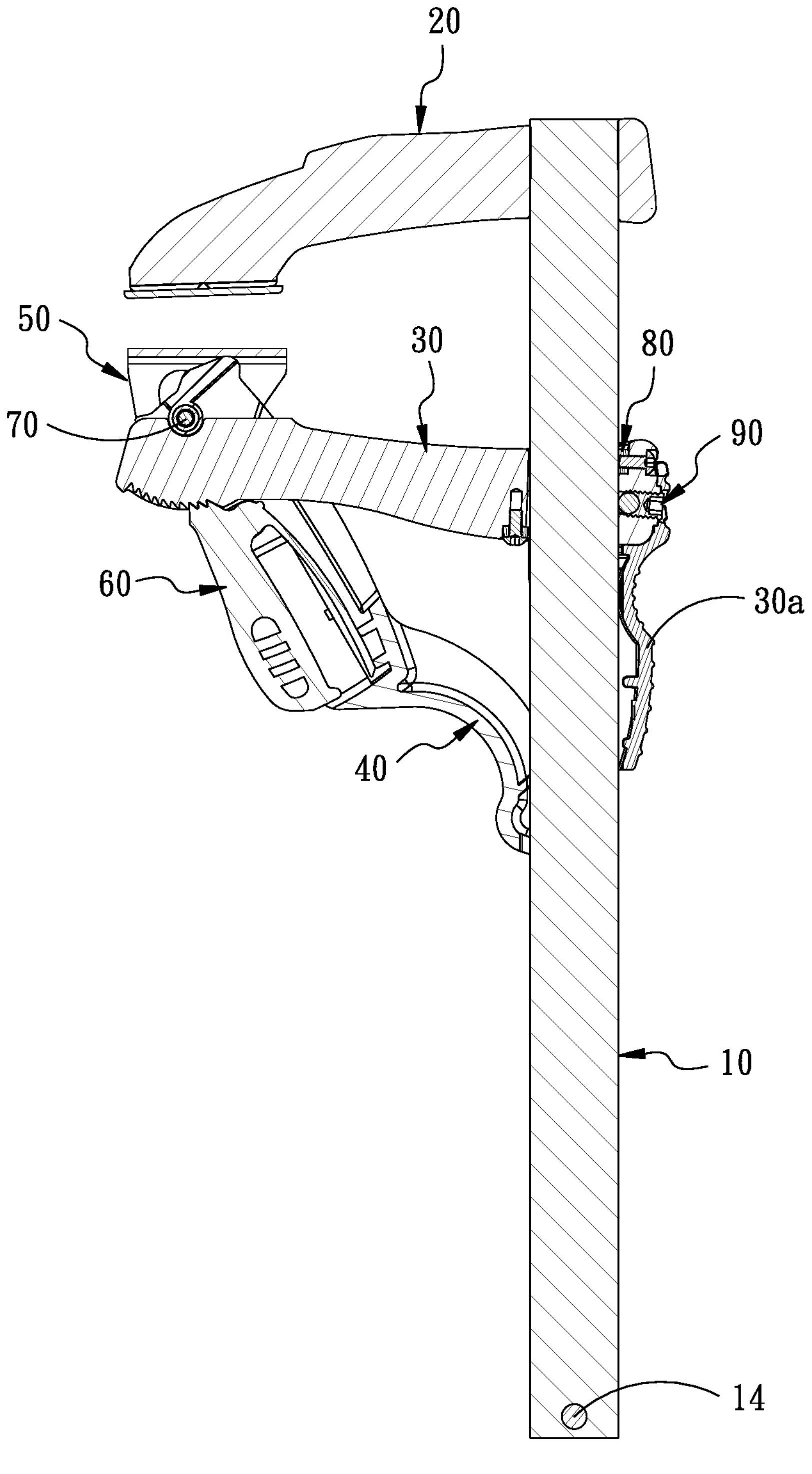
FIG. 9 is a sectional view of FIG. 8.

The movable arm 30 comprises a first end 31 and a second end 32. The first end 31 comprises a slide hole 33 to be mounted around the slide rod 10, so as to slide with respect to the slide rod 10. As shown by FIG. 6, the movable arm 30 comprises a first lock hole 34 and a second lock hole 35 disposed on two sides of the slide hole 33, respectively. The first lock hole 34 is arranged in parallel to the slide hole 33. The second lock hole 35 is in transverse communication with the slide hole 33. Therein, the first lock hole 34 is in communication with a first housing space 341, and the second lock hole 35 is in communication with a second housing space 351.

Figure 2:
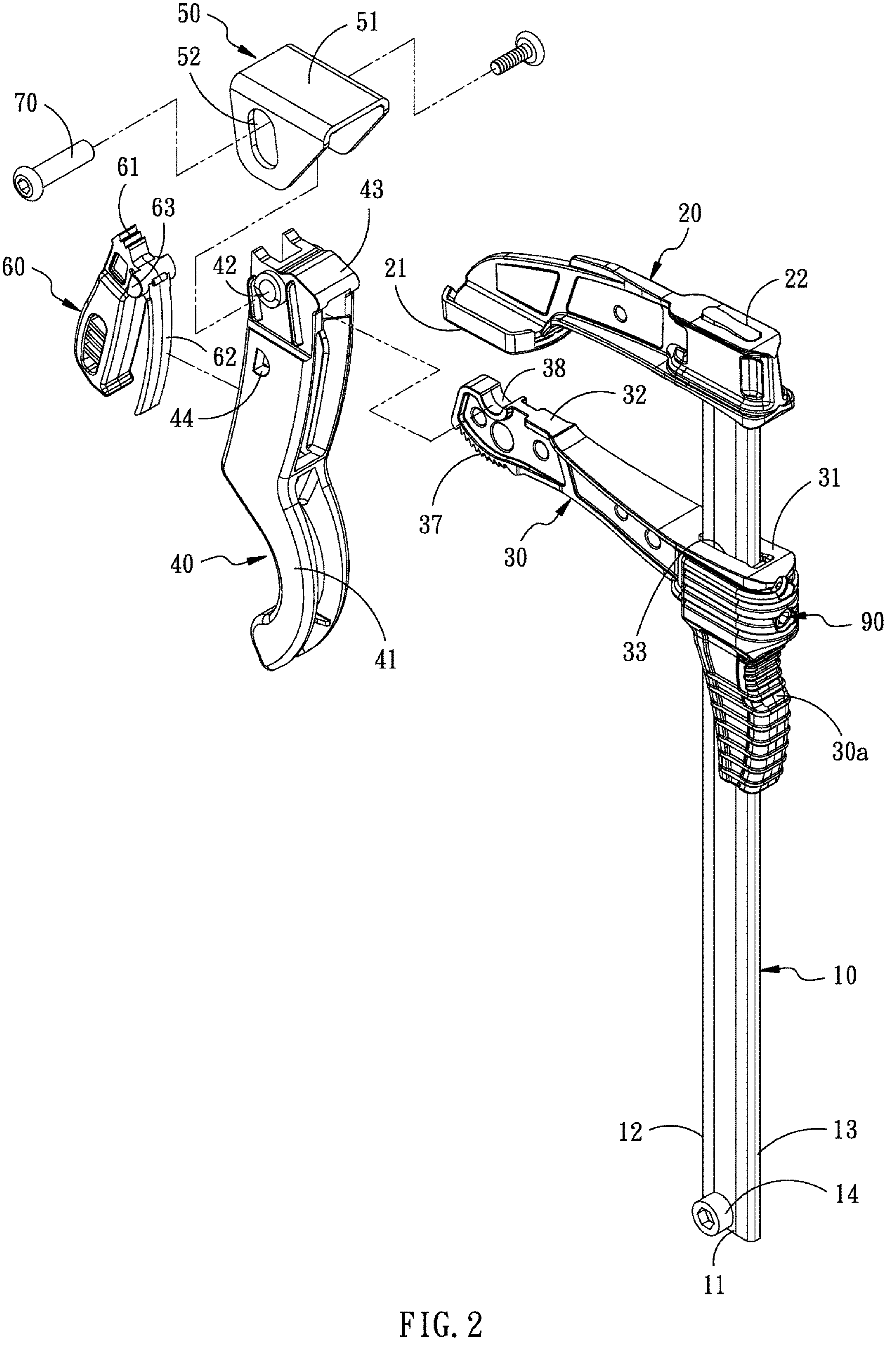
FIG. 2 is an exploded view of the one-handed ratchet clamp tool in accordance with an embodiment of the present invention.
Figure 3:
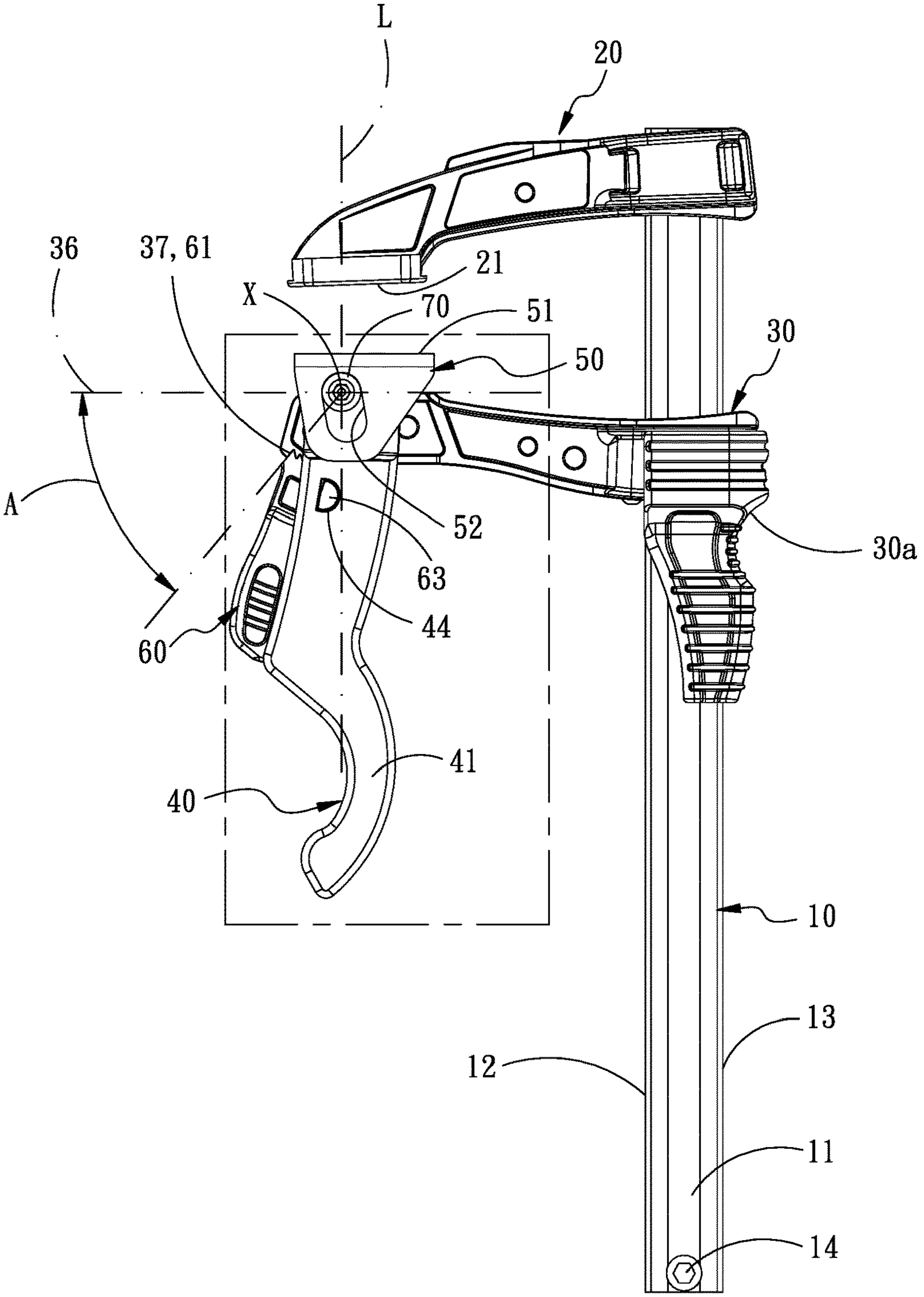
FIG. 3 is a side view of the one-handed ratchet clamp tool in accordance with an embodiment of the present invention.

Referring to FIG. 2 and FIG. 3, the second end 32 defines an imaginary face 36 and comprises a ratchet 37 arranged on one side in opposite to the first clamping face 21. The ratchet 37 comprises at least 10 teeth. The ratchet 37 and the imaginary face 36 include a dip angle A larger than 30 degrees. In the embodiment, the dip angle A is 50 degrees. When the present invention is used to clamp an object, the imaginary face 36 is approximately in parallel to the surface of the object. Also, the second end 32 comprises an open recess 38 facing the first clamping face 21.

The operation lever 40 is pivotally disposed on the second end 32 of the movable arm 30. In the embodiment, the operation lever 40 is pivotally disposed on the second end 32 of the movable arm 30 along a pivot shaft 70. The movable arm 30 defines a longitudinal axle L which is perpendicular to the imaginary face 36 and passes through an axle center X of the pivot shaft 70. Therein, the longitudinal axle L is in parallel to a length direction of the slide rod 10. A distance between the second narrow lateral side 13 of the slide rod 10 and the operation lever 40 is larger than a distance between the first narrow lateral side 12 and the operation lever 40.

Figure 4:
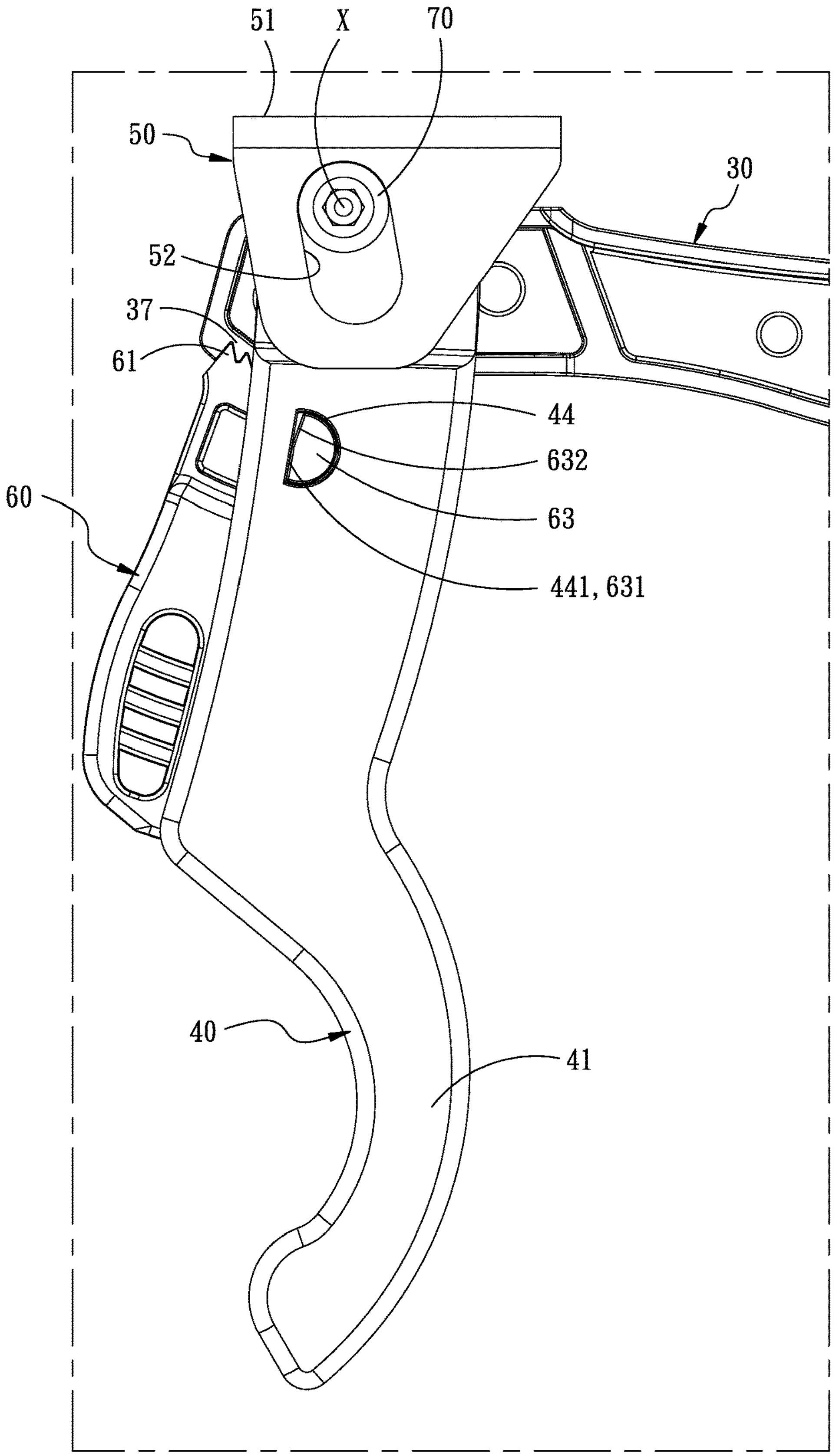
FIG. 4 is a partially enlarged view of FIG. 3.
Figure 5:
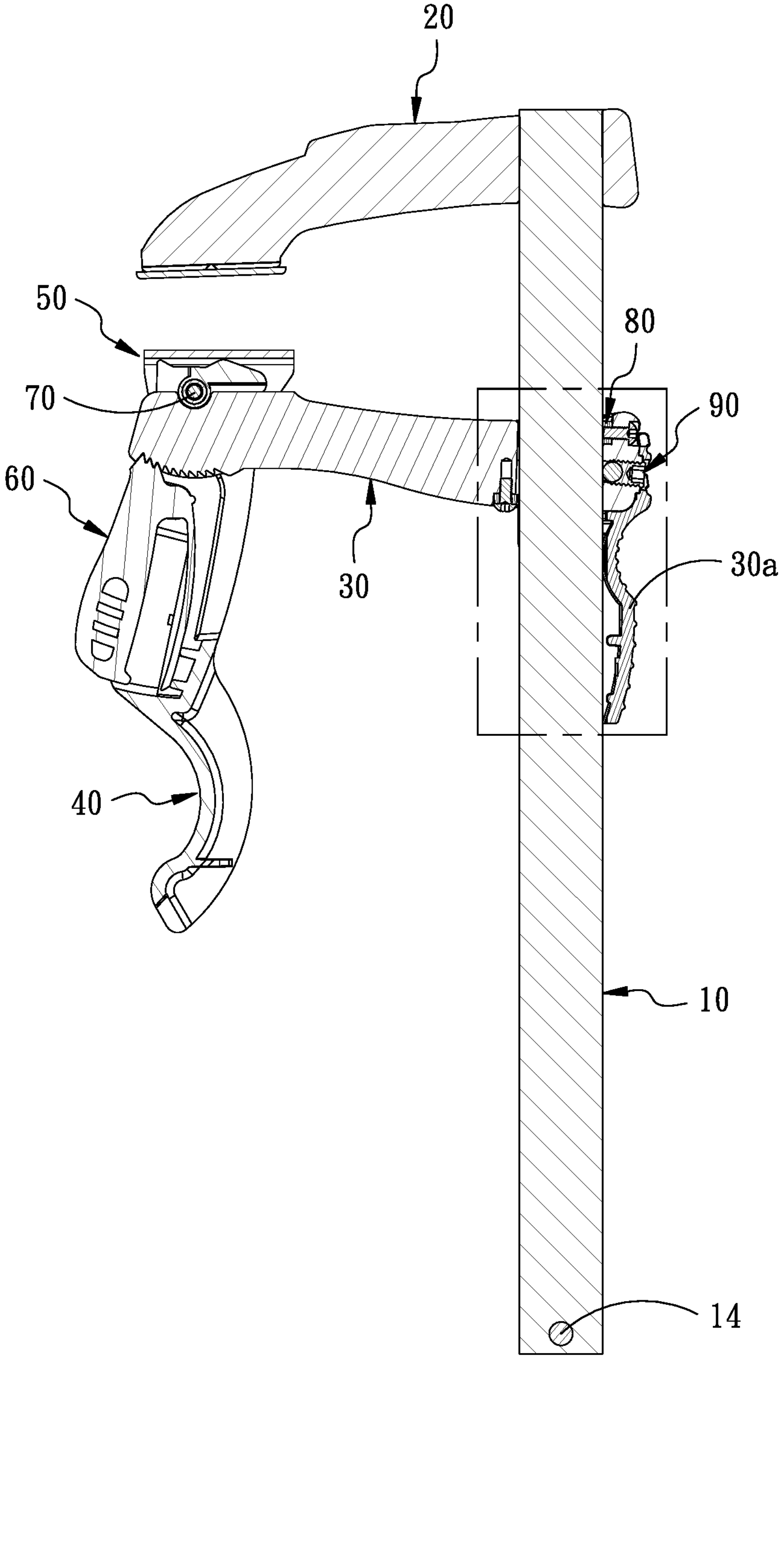
FIG. 5 is a sectional view of the one-handed ratchet clamp tool in accordance with an embodiment of the present invention.

The operation lever 40 comprises a pressing part 41 formed in a concave arc shape, and a pivot hole 42 and a protrusion part 43 away from the pressing part 41. The pressing part 41 is biased from the longitudinal axle L toward the slide rod 10. The aforementioned pivot shaft 70 passes through the pivot hole 42 and is held by the recess 38, allowing the operation lever 40 to pivotally sway with respect to the movable arm 30. Referring to FIG. 2 and FIG. 4, the operation lever 40 comprises a non-circular assembly bore 44 in adjacent to the pivot hole 42, and the assembly bore 44 comprises an abutting wall 441.

The clamp member 50 is movably disposed on the operation lever 40. The clamp member 50 comprises a second clamping face 51 disposed in positional alignment with the first clamping face 21. In the embodiment, the clamp member 50 comprises a long groove 52 combined with the aforementioned pivot shaft 70, such that the clamp member 50 and the operation lever 40 are connected on the movable arm 30, and the clamp member 50 is allowed to pivotally sway with respect to the movable arm 30. The operation lever 40 optionally presses the clamp member 50 through the protrusion part 43, such that the first clamping face 21 and the second clamping face 51 clamp or release together.

Figure 10:
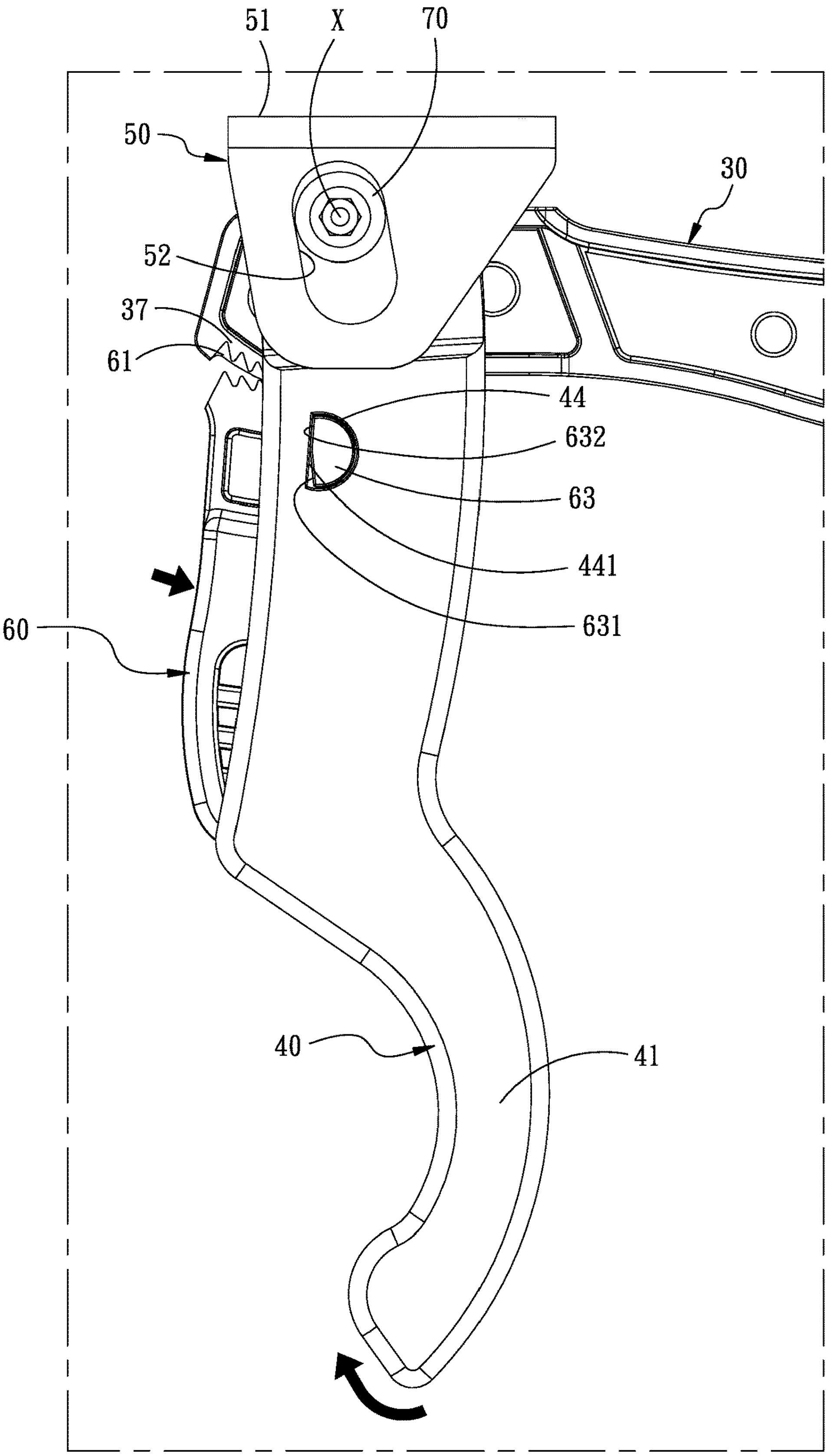
FIG. 10 is an operational schematic view of the release member being pressed.

Referring to FIG. 2, FIG. 4, and FIG. 10, the release member 60 is connected with the operation lever 40. The release member 60 comprises a pawl 61. The release member 60 is allowed to be operated between an engagement position and a disengagement position. At the engagement position, the pawl 61 is engaged with the ratchet 37, so as to position the operation lever 40. At the disengagement position, the pawl 61 is disengaged from the ratchet 37, so that the operation lever 40 is allowed to sway away from the movable arm 30, thereby releasing the object.

Therein, the release member 60 has an elastic arm 62 extending therefrom to abut against the operation lever 40, so as to be maintained at the engagement position, such that the operation lever 40 is in a positioned status. As shown by FIG. 4, the release member 60 comprises a non-circular convex shaft 63, which is disposed in the assembly bore 44 and biased by a small angle. The convex shaft 63 comprises a first contact face 631 and a second contact face 632. The first contact face 631 and the second contact face 632 are not arranged on a same plane, wherein the first contact face 631 and the second contact face 632 are biased by an angle which is 15 degrees or less to facilitate the pressing operation. Therefore, at the engagement position as shown by FIG. 4, the first contact face 631 abuts against the abutting wall 441 of the assembly bore 44. And, as shown by FIG. 10, when the release member 60 is pressed by a force to be switched from the engagement position to the disengagement position, the pawl 61 is disengaged from the ratchet 37, enabling the operation lever 40 to pivotally sway away from the movable arm 30 for releasing the object. Therein, when the release member 60 is being pressed, the second contact face 632 abuts against the abutting wall 441, so as to limit a bias angle of the release member 60 with respect to the operation lever 40.

Referring to FIG. 3 and FIG. 7 to FIG. 9, the dip angle A included by the ratchet 37 and the imaginary face 36 is larger than 30 degrees, such that the operation lever 40 is allowed to be biased toward the slide rod 10 on the movable arm 30. With such configuration, the user is able to conveniently grip the operation lever 40 and the slide rod 10 by using one hand, so as to pull the operation lever 40, whereby the clamp member 50 and the fixed arm 20 clamp the object together. Also, the minimum distance from the pressing part 41 to the slide rod 10 ranges from 80 mm to 100 mm, which is adapted to the largest width of the expanding palm of the user, facilitating the one-hand operation by the user.

In another embodiment of the present embodiment, a wear-resistant abutting device 80 is disposed between the movable arm 30 and the slide rod 10, so as to prevent the slide wearing between the movable arm 30 and the slide rod 10 after a long-time usage from affecting the clamping effect. Therein, referring to FIG. 6, the wear-resistant abutting device 80 comprises a first wear-resistant member 81 and a second wear-resistant member 82. The first wear-resistant member 81 is removably disposed between the movable arm 30 and the first narrow lateral side 12. The second wear-resistant member 82 is removably disposed between the movable arm 30 and the second narrow lateral side 13.

The first wear-resistant member 81 is fastened to the first lock hole 34 through a first fastening member 83, and the second wear-resistant member 82 is fastened to the second lock hole 35 through a second fastening member 84. Also, the first wear-resistant member 81 is positioned in the first housing space 341 and not exposed from the bottom edge of the movable arm 30. The first wear-resistant member 81 is formed in a rectangular shape and has one lateral side thereof abutting against the first narrow lateral side 12. The second wear-resistant member 82 is positioned in the second housing space 351 and not exposed from the top edge of the movable arm 30. The second wear-resistant member 82 is formed in a rectangular shape and has one lateral side thereof abutting against the second narrow lateral side 13. Therefore, when each abutting lateral side of the first wear-resistant member 81 and the second wear-resistant member 82 is worn out, each of the first wear-resistant member 81 and the second wear-resistant member 82 is allowed to be rotated by detaching the first fastening member 83 and the second fastening member 84 to have another lateral side not yet worn out abut against the first narrow lateral side 12 and the second narrow lateral side 13, respectively, to facilitate continuous usage. When four lateral sides of the first wear-resistant member 81 and the second wear-resistant member 82 are all worn out, the original first wear-resistant member 81 and second wear-resistant member 82 can be replaced with new ones.

In another embodiment of the present invention, a positioning device 90 is disposed between the second narrow lateral side 13 of the slide rod 10 and the movable arm 30. With the positioning device 90 abutting against the second narrow lateral side 13, the movable arm 30 is allowed to be effectively engaged and positioned on the slide rod 10.

Referring to FIG. 6, the positioning device 90 comprises a combining member 91 and a bead member 92. The combining member 91 is a set screw, which is screwed to a thread bore **30*b* of the movable arm 30. The bead member 92 is rotatably disposed on an end part of the combining member 91 and abuts against the second narrow lateral side 13, whereby the movable arm 30 is engaged and positioned on the slide rod 10**.

In another embodiment of the present invention, a grip **30*a* is further included. The grip 30*a* is removably mounted around the first end 31 of the movable arm 30, providing an optimal gripping comfort and stability for the user during clamping operation. Further, to prevent the detachment of the movable arm 30 from the slide rod 10, a fixing screw member 14 is fixed to one end of the slide rod 10 away from the fixed arm 20, thereby preventing the movable arm 30 from leaving the slide rod 10 toward the direction away from the fixed arm 20**.

Figure 11:
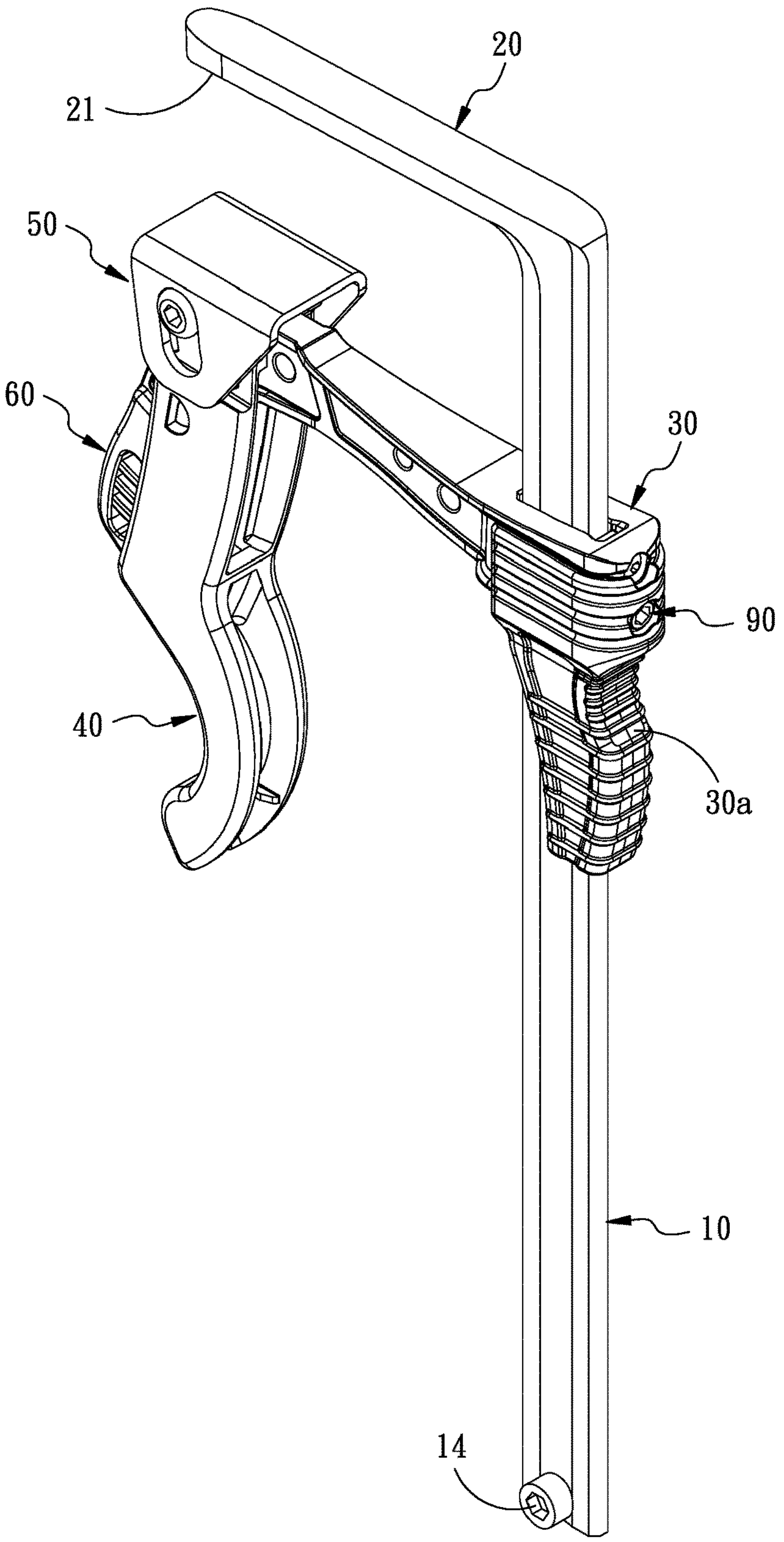
FIG. 11 is a perspective view of the one-handed ratchet clamp tool in accordance with another embodiment of the present invention.

Referring to FIG. 11, in another embodiment of the present invention, the slide rod 10 and the fixed arm 20 are integrally formed. In other words, the fixed arm 20 and the slide rod 10 form an L-shaped rod member.

With the foregoing configuration, with an optimal design of the dip angle A of the ratchet 37, the operation lever 40 is biased toward the slide rod 10 on the movable arm 30, facilitating a one-handed and ergonomic operation, so as to lower the burden on the hand of the user.

Also, with the wear-resistant abutting device 80 removably disposed between the movable arm 30 and the slide rod 10, the relative position of the movable arm 30 with respect to the slide rod 10 is prevented from changing due to wearing, so as to maintain the clamping effect of the clamp tool and facilitate the convenience of maintenance and parts replacement.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A one-handed ratchet clamp tool, comprising:
- a slide rod;
- a fixed arm disposed on one end of the slide rod and comprising a first clamping face;
- a movable arm comprising a first end and a second end, the first end mounted around the slide rod and slidable with respect to the slide rod, the second end defining an imaginary face and comprising a ratchet arranged away from the first clamping face, the ratchet and the imaginary face including a dip angle larger than 30 degrees;
- an operation lever comprising a non-circular assembly bore and pivotally disposed on the second end of the movable arm along a pivot shaft, wherein the movable arm defines a longitudinal axle perpendicular to the imaginary face and passes through an axle center of the pivot shaft, and the non-circular assembly bore comprises an abutting wall;
- a clamp member movably disposed on the operation lever, comprising a second clamping face arranged in positional alignment with the first clamping face, wherein the operation lever is configured to press the clamp member, whereby the first clamping face and the second clamping face clamp or release together; and
- a release member connected with the operation lever and comprising a pawl, an elastic arm and a non-circular convex shaft, wherein the non-circular convex shaft is disposed in the non-circular assembly bore, the pawl is engaged with the ratchet to position the operation lever at an engagement position, the pawl is disengaged from the ratchet and allowing the operation lever to sway away from the movable arm at a disengagement position, and the elastic arm extends to abut against the operation lever for maintaining at the engagement position;
- wherein the convex shaft comprises a first contact face and a second contact face, the first contact face and the second contact face are arranged on different planes, the first contact face abuts against the abutting wall at the engagement position, the second contact face abuts against the abutting wall at the disengagement position.

2. The one-handed ratchet clamp tool of claim 1, wherein the dip angle is 50 degrees; the longitudinal axle is in parallel to a length direction of the slide rod.

3. The one-handed ratchet clamp tool of claim 1, wherein the operation lever comprises a pressing part biased from the longitudinal axle toward the slide rod, and a pivot hole and a protrusion part arranged away from the pressing part; the second end comprises an open recess facing the first clamping face; the pivot shaft passes through the pivot hole and is held by the recess; the protrusion part presses the clamp member.

4. The one-handed ratchet clamp tool of claim 3, wherein the clamp member comprises a long groove combined with the pivot shaft.

5. The one-handed ratchet clamp tool of claim 3, wherein a minimum distance from the pressing part to the slide rod ranges from 80 mm to 100 mm.

6. A one-handed ratchet clamp tool comprising:
- a slide rod;
- a fixed arm disposed on one end of the slide rod and comprising a first clamping face;
- a movable arm comprising a first end and a second end, wherein the first end comprises a slide hole to be mounted around the slide rod; and slidable with respect to the slide rod, the second end defining an imaginary face and comprising a ratchet arranged away from the first clamping face, the ratchet and the imaginary face including a dip angle larger than 30 degrees;

an operation lever pivotally disposed on the second end of the movable arm;

a clamp member movably disposed on the operation lever, comprising a second clamping face arranged in positional alignment with the first clamping face, wherein the operation lever is configured to press the clamp member, whereby the first clamping face and the second clamping face clamp or release together;

a release member connected with the operation lever and comprising a pawl, wherein the pawl is engaged with the ratchet to position the operation lever at an engagement position, the pawl is disengaged from the ratchet, allowing the operation lever to sway away from the movable arm at a disengagement position; and a wear-resistant abutting device is disposed between the movable arm and the slide rod, comprising a first wear-resistant member and a second wear-resistant member;

wherein the slide rod comprises two wide lateral sides, and a first narrow lateral side and a second narrow lateral side arranged between the two wide lateral sides;

wherein a distance between the second narrow lateral side and the operation lever is larger than a distance between the first narrow lateral side and the operation lever; and wherein the first wear-resistant member is removably disposed between the movable arm and the first narrow lateral side, and the second wear-resistant member is removably disposed between the movable arm and the second narrow lateral side.

7. The one-handed ratchet clamp tool of claim 6, wherein the movable arm comprises a first lock hole and a second lock hole disposed on two sides of the slide hole, respectively; the first lock hole is arranged in parallel to the slide hole, the second lock hole is in transverse communication with the slide hole; the first wear-resistant member is fastened to the first lock hole through a first fastening member, and the second wear-resistant member is fastened to the second lock hole through a second fastening member.

8. The one-handed ratchet clamp tool of claim 6, wherein a positioning device is disposed between the second narrow lateral side and the movable arm.

9. The one-handed ratchet clamp tool of claim 8, wherein the positioning device comprises a combining member and a bead member; the combining member is screwed to the movable arm; the bead member is rotatably disposed on an end part of the combining member and abuts against the second narrow lateral side.

10. The one-handed ratchet clamp tool of claim 6, further comprising a grip removably mounted around the first end of the movable arm.

* * * * *